US011199612B2

(12) United States Patent
Qi et al.

(10) Patent No.: US 11,199,612 B2
(45) Date of Patent: Dec. 14, 2021

(54) DIRECT WAVE SUPPRESSION METHOD AND SYSTEM FOR MICROWAVE IMAGING SYSTEM

(71) Applicants: Shenzhen Victooth Terahertz Technology Co., Ltd., Guangdong (CN); Shenzhen Institute of Terahertz Technology and Innovation, Guangdong (CN)

(72) Inventors: Chunchao Qi, Guangdong (CN); Guangsheng Wu, Guangdong (CN); Shukai Zhao, Guangdong (CN); Qian Xiao, Guangdong (CN); Aixian Wang, Guangdong (CN)

(73) Assignees: Shenzhen Victooth Terahertz Technology Co., Ltd., Shenzhen (CN); Shenzhen Institute of Terahertz Technology and Innovation, Shenzhen (CN)

( * ) Notice: Subject to any disclaimer, the term of this patent is extended or adjusted under 35 U.S.C. 154(b) by 249 days.

(21) Appl. No.: 16/608,172

(22) PCT Filed: Sep. 4, 2017

(86) PCT No.: PCT/CN2017/100402
§ 371 (c)(1),
(2) Date: Oct. 24, 2019

(87) PCT Pub. No.: WO2018/196248
PCT Pub. Date: Nov. 1, 2018

(65) Prior Publication Data
US 2020/0142053 A1   May 7, 2020

(30) Foreign Application Priority Data

Apr. 28, 2017 (CN) .......................... 201710295635.2

(51) Int. Cl.
*G01S 7/03* (2006.01)
*G01S 7/28* (2006.01)
(Continued)

(52) U.S. Cl.
CPC ............ *G01S 7/038* (2013.01); *G01S 7/2806* (2013.01); *G01S 7/4026* (2013.01);
(Continued)

(58) Field of Classification Search
CPC ...... G01S 7/292; G01S 7/2922; G01S 7/2927; G01S 7/354; G01S 7/40; G01S 13/88; G01S 13/887; G01S 13/888
See application file for complete search history.

(56) References Cited

U.S. PATENT DOCUMENTS 5,539,412 A * 7/1996 Mendelson ......... G01S 13/5244
342/192
6,967,612 B1 * 11/2005 Gorman ................. G01S 13/34
342/22

(Continued)

FOREIGN PATENT DOCUMENTS

CN   102508240 A   6/2012
CN   102520402 A   6/2012
(Continued)

*Primary Examiner* — Peter M Bythrow
(74) *Attorney, Agent, or Firm* — Young Basile Hanlon & MacFarlane, P.C.

(57) ABSTRACT

Provided are a direct wave suppression method and system for a microwave imaging system. The method includes a series of filtering operations, such as conversion from a frequency domain to a time domain, filtering, conversion from the time domain to the frequency domain, and cancellation subtraction, on an echo signal set composed of echo signals obtained by a vertical linear array antenna at all the equivalent antenna collection positions thereof.

10 Claims, 5 Drawing Sheets

(51) Int. Cl.
*G01S 7/40* (2006.01)
*G01S 13/89* (2006.01)
*G01N 22/00* (2006.01)
*G01S 13/88* (2006.01)

(52) U.S. Cl.
CPC ............ *G01S 13/887* (2013.01); *G01S 13/89* (2013.01); *G01N 22/00* (2013.01)

(56) References Cited

U.S. PATENT DOCUMENTS

| | | | | |
|---|---|---|---|---|
| 7,345,618 | B1* | 3/2008 | Cole | G01S 13/32 342/22 |
| 7,804,441 | B1* | 9/2010 | DeChiaro, Jr. | G01V 8/005 342/22 |
| 9,229,102 | B1* | 1/2016 | Wright | G01S 13/887 |
| 2002/0130807 | A1* | 9/2002 | Hall | G08B 13/187 342/28 |
| 2002/0175850 | A1* | 11/2002 | Barnes | G01S 13/0209 342/22 |
| 2004/0149907 | A1* | 8/2004 | Vaidya | H04N 5/3651 250/336.1 |
| 2004/0149909 | A1* | 8/2004 | Vaidya | H01Q 13/085 250/338.1 |
| 2006/0017605 | A1* | 1/2006 | Lovberg | G01K 7/226 342/22 |
| 2007/0046278 | A1* | 3/2007 | Taenzer | G10K 11/341 324/76.77 |
| 2007/0052576 | A1* | 3/2007 | Hausner | G01S 7/024 342/22 |
| 2008/0006767 | A1* | 1/2008 | Taday | G01N 21/3586 250/252.1 |
| 2010/0130873 | A1* | 5/2010 | Yuen | A61B 5/0022 600/484 |
| 2011/0181455 | A1* | 7/2011 | Vanuytven | G01S 13/44 342/27 |
| 2012/0038666 | A1* | 2/2012 | Evers | G01V 5/0008 345/629 |
| 2012/0206293 | A1* | 8/2012 | Nguyen | G01S 13/9017 342/25 F |
| 2013/0113647 | A1* | 5/2013 | Sentelle | G01S 13/887 342/22 |
| 2016/0061944 | A1* | 3/2016 | Minowa | G01S 7/2806 342/160 |
| 2016/0195606 | A1* | 7/2016 | Sugino | G01S 13/56 342/195 |
| 2016/0223666 | A1* | 8/2016 | Kim | G01S 7/025 |
| 2018/0263502 | A1* | 9/2018 | Lin | A61B 8/02 |

FOREIGN PATENT DOCUMENTS

| | | |
|---|---|---|
| CN | 106338732 A | 1/2017 |
| CN | 106556820 A | 4/2017 |
| JP | 2016038267 A | 3/2016 |

* cited by examiner

DIRECT WAVE SUPPRESSION METHOD AND SYSTEM FOR MICROWAVE IMAGING SYSTEM

CROSS-REFERENCE TO RELATED APPLICATION(S)

This application is a 371 application of International Application No. PCT/CN2017/100402, filed on Sep. 4, 2017, which claims priority to Chinese Patent Application No. 201710295635.2, filed on Apr. 28, 2017, the entire disclosure of both of which are hereby incorporated by reference in their entireties.

TECHNICAL FIELD

The disclosure belongs to the technical field of microwave imaging, and particularly relates to a direct wave suppression method and system for a microwave imaging system.

BACKGROUND

The microwave imaging technology carries out scan imaging on objects by means of actively-transmitted electromagnetic microwaves which can penetrate through the surfaces of objects to detect metallic or non-metallic prohibited articles hidden in the objects. The microwave imaging technology has the characteristics of small radiation dosage, non-ionizing radiation, and the like, thereby being widely applied to microwave imaging systems such as safety inspection instruments to perform human safety inspection tasks. According to the existing microwave imaging technology, echo signals at all the equivalent antenna collection positions need to be acquired by means of a linear array antenna to form an echo signal set, which is then sent to a signal processing unit of a safety inspection system to be processed in a unified manner for imaging, so that the image of a target object is obtained.

However, in actual application, the echo signal set obtained from the linear array antenna at all the equivalent antenna collection positions thereof further comprises a part of direct wave signals with energy larger than echo energy reflected by the target object by several magnitudes, and if these direct wave signals are not suppressed or filtered out, the sensitivity of an echo signal receiver may be reduced, as a result, the front end of the receiver will be saturated and even be damaged, which increases the difficulty of subsequent imaging processing and lowers the imaging performance of a microwave imaging system, and thus no accurate image of the target object can be obtained.

SUMMARY

The disclosure provides a direct wave suppression method and system for a microwave imaging system to solve the problem that, in actual application, a part of echo signals obtained by a linear array antenna at equivalent antenna collection positions comprises direct wave signals with energy larger than echo energy reflected by a target object by several magnitudes, and if these direct wave signals are not suppressed or filtered out, the sensitivity of an echo signal receiver may be reduced, as a result, the front end of the receiver will be saturated and even be damaged, which increases the difficulty of a subsequent imaging processing process and lowers the imaging performance of a microwave imaging system, and thus no accurate image of the target object can be obtained.

The disclosure provides a direct wave suppression method for a microwave imaging system. The direct wave suppression method comprises:

Controlling the rotation of a vertical linear array antenna composed of M antennas around a pre-set arc track to scan N azimuth position points in a target area, so as to acquire M*N frequency domain echo signals and to create a frequency domain echo signal set, wherein M and N are both positive integers greater than 0;

Calculating, by means of a first pre-set algorithm, N frequency domain echo signals obtained by means of pre-set antennas among the M antennas scanning the N azimuth position points, to obtain N target time domain echo signals corresponding to the pre-set antennas;

Respectively calculating an average value of each target time domain echo signal among the N target time domain echo signals, and filtering a pre-set area where the target time domain echo signal with the maximum average value is located, to obtain N filtered target time domain signals;

Calculating the N filtered target time domain signals by means of a second pre-set algorithm to obtain N target frequency domain echo signals with the frequencies and dimensions consistent with those of the N frequency domain echo signals;

Carrying out cancellation subtraction on the N target frequency domain echo signals and the N target time domain echo signals to obtain direct wave suppression results of the N frequency domain echo signals; and Returning to the step of calculating, by means of a first pre-set algorithm, N frequency domain echo signals obtained by means of pre-set antennas among the M antennas scanning the N azimuth position points until the direct wave suppression results of the total M*N frequency domain echo signals obtained by means of all the antennas among the M antennas scanning the N azimuth position points are obtained.

The disclosure further provides a direct wave suppression system for a microwave imaging system. The direct wave suppression system comprises:

A frequency domain echo signal acquisition module used for controlling the rotation of a vertical linear array antenna composed of M antennas around a pre-set arc track to scan N azimuth position points in a target area, so as to acquire M*N frequency domain echo signals and to create a frequency domain echo signal set, wherein M and N are both positive integers greater than 0;

A time domain echo signal processing module used for calculating, by means of a first pre-set algorithm, N frequency domain echo signals obtained by means of pre-set antennas among the M antennas scanning the N azimuth position points, to obtain N target time domain echo signals corresponding to the pre-set antennas;

A target time domain echo signal processing module used for respectively calculating an average value of each target time domain echo signal among the N target time domain echo signals and filtering a pre-set area where the target time domain echo signal with the maximum average value is located, to obtain N filtered target time domain signals;

A frequency domain echo signal processing module used for calculating the N filtered target time domain signals by means of a second pre-set algorithm to obtain N target frequency domain echo signals with the frequencies and dimensions consistent with those of the N frequency domain echo signals;

A cancellation subtraction module used for carrying out cancellation subtraction on the N target frequency domain echo signals and the N target time domain echo signals to obtain direct wave suppression results of the N frequency domain echo signals; and A return module used for returning to the step of calculating, by means of a first pre-set algorithm, N frequency domain echo signals obtained by means of pre-set antennas among the M antennas scanning the N azimuth position points until the direct wave suppression results of the total M*N frequency domain echo signals obtained by means of all the antennas among the M antennas scanning the N azimuth position points are obtained.

By means of carrying out a series of filtering operations, such as conversion from a frequency domain to a time domain, filtering, conversion from the time domain to the frequency domain, and the cancellation subtraction, on the echo signal set composed of the echo signals obtained from the vertical linear array antenna at all the equivalent antenna collection positions thereof, interference caused by a direct wave signal can be effectively suppressed, thus improving the sensitivity of an echo signal receiver, simplifying the subsequent imaging processing process, and improving the imaging performance of a microwave imaging system. Thus, an accurate image of a target object can be obtained.

BRIEF DESCRIPTION OF DRAWINGS

In order to explain the technical solutions of the embodiments of the disclosure more clearly, a brief description of the accompanying drawings required for illustrating the embodiments is given below. Clearly, the accompanying drawings are provided for illustrating certain embodiments only, and those ordinarily skilled in the art can obtain other drawings based on the following ones without creative work.

DETAILED DESCRIPTION

In order to provide a better understanding of the technical solutions of the disclosure for those skilled in the art, the technical solutions of the embodiments are clearly described below with reference to the accompanying drawings. Clearly, the embodiments in the following description are illustrative ones only, and are not all possible ones of the disclosure. All other embodiments obtained by those ordinarily skilled in the art based on these illustrative ones without creative work should also fall within the protection scope of the disclosure.

The term "comprise" involved in the description, claims and accompanying drawings, and any transformations of this term refer to non-exclusive inclusion. For instance, a process or method comprising a series of steps, or a system or product comprising a series of modules is not limited to the steps or modules listed, and may also optionally include steps or modules which are not listed, or optionally include other intrinsic steps of the process or method, or other intrinsic modules of the system or product.

All the embodiments of the disclosure are implemented on the basis of a microwave imaging system which comprises a linear array antenna formed by a pre-set number of antennas which are linearly arrayed in the horizontal or vertical direction, a signal transceiver, a mechanical rotating device, and a signal processing unit.

In specific applications, a graphics processing unit (GPU) is adopted to serve as the signal processing unit.

The mechanical rotating device controls the linear array antenna to rotate, the signal transceiver transmits a signal and then receives echo data reflected by a target object to be imaged in the rotating process of the linear array antenna, and then the echo data is sent to the signal processing unit to be processed into an imaging result by the signal transceiver, so that scan imaging of all sampling points on the target object to be imaged is realized. The microwave imaging system comprises a planar scanning system or a cylindrical scanning system in terms of the shape of a scan surface formed by equivalent phase positions in the rotating process of the linear array antenna.

Figure 1:
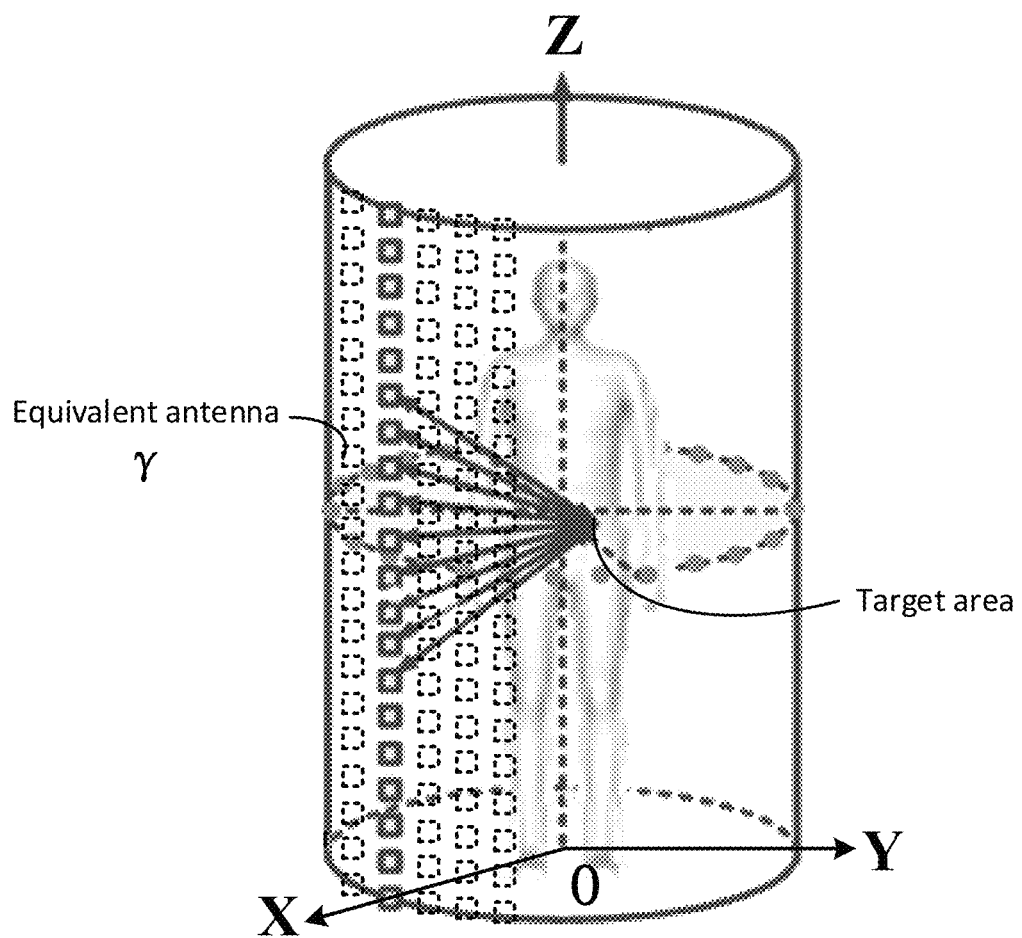
FIG. 1 is a schematic diagram of a cylindrical scanning system in a Cartesian coordinate system in one embodiment of the disclosure.

The operating principle of the cylindrical scanning system is emphatically introduced below:

As shown in FIG. 1, an object to be imaged is set as a human body, a plane where the human body stands is set as a horizontal plane, an axis which is orthogonal to an X axis and is located on the same horizontal plane as the X axis is set as a Y axis. The X axis, the Y axis, and a Z axis are set to be intersected at point O on a geometric central axis, and a Cartesian coordinate system X-Y-Z-O including the X axis, the Y axis, and the Z axis is established with the point O as the origin.

N antennas are arrayed in the Z-axis direction perpendicular to the horizontal plane to form the vertical linear array antenna, and after the linear array antenna rotates around the geometric central axis by one circle, a plurality of equivalent antennas γ which are spaced from one another by equal azimuth angles and equal heights are equivalently formed on a cylindrical surface.

A frequency domain echo signal set formed by the echo signals acquired at all equivalent antennas γ positions is obtained, and then imaging processing is carried out on time-frequency information of sampling points corresponding to all the echo signals in the frequency domain echo signal set, so that a three-dimensional image of a human body target area is generated.

The disclosure provides a direct wave suppression method and system for a microwave imaging system. By means of processing a direct wave signal in the time-frequency information of the sampling points corresponding to all the echo signals in the frequency domain echo signal set, interference caused by the direct wave signal can be effectively suppressed, thus improving the sensitivity of an echo signal receiver, simplifying the subsequent imaging processing process, and improving the imaging performance of a microwave imaging system. Thus, an accurate image of a target object can be obtained.

Figure 2:
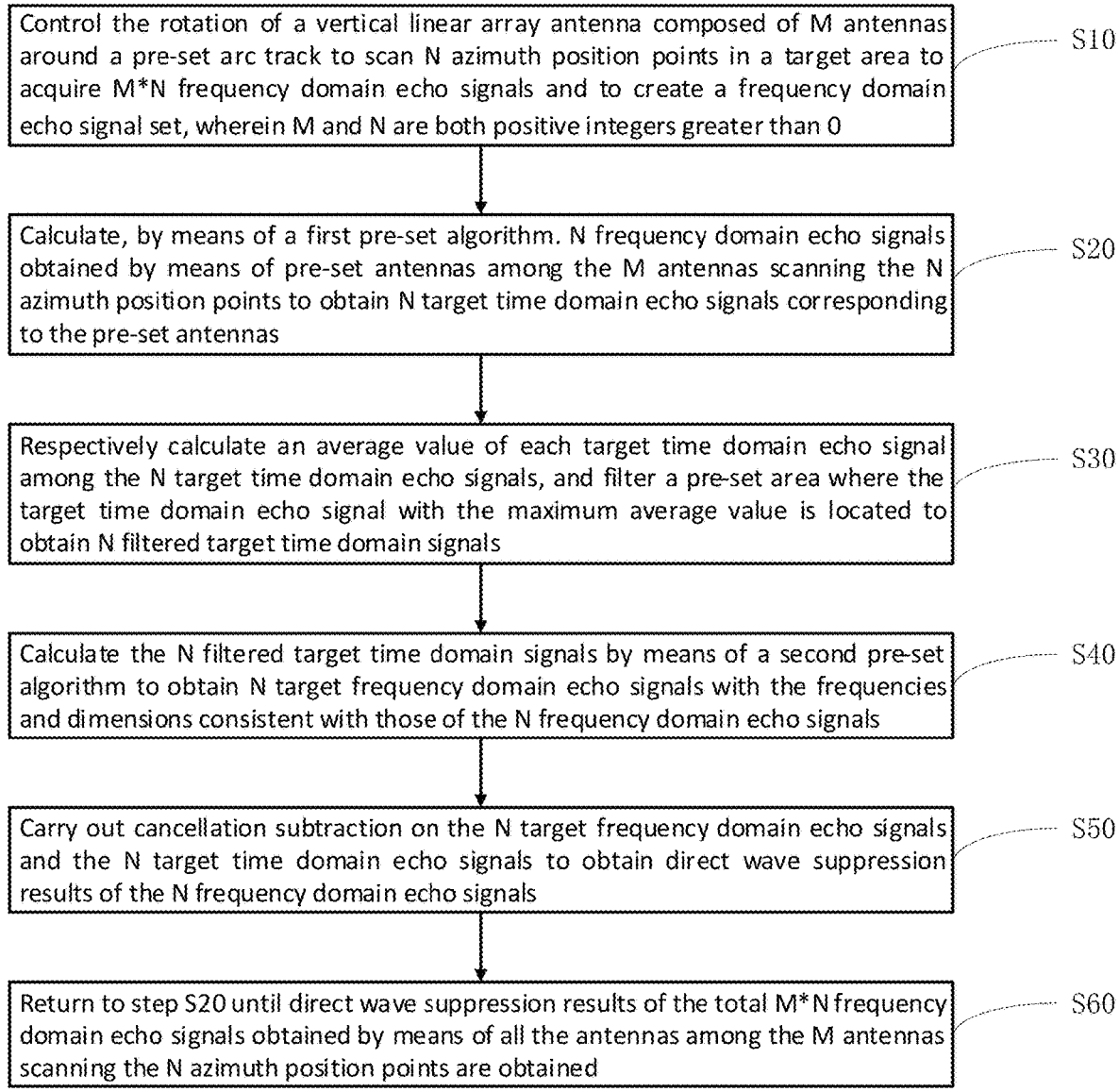
FIG. 2 is a flow block diagram of a direct wave suppression method for a microwave imaging system in one embodiment of the disclosure.

As shown in FIG. 2, one embodiment of the disclosure provides a direct wave suppression method for a microwave imaging system. The direct wave suppression method comprises:

S10: a vertical linear array antenna composed of M antennas is controlled to rotate around a pre-set arc track to scan N azimuth position points in a target area, so as to acquire M*N frequency domain echo signals and to create a frequency domain echo signal set, wherein M and N are both positive integers greater than 0.

In this embodiment, the target area is an area where the object to be imaged is located, the size of this area is particularly determined by the size of a scan area covered by the linear array antenna, rotating by one circle, of the microwave imaging system, and the arc track is orthogonal to the vertical linear array antenna.

In specific applications, the object to be imaged is a human body, an organic or inorganic body, or a two-dimensional or a three-dimensional object.

S20: N frequency domain echo signals obtained by means of pre-set antennas among the M antennas scanning the N azimuth position points are calculated by means of a first pre-set algorithm, to obtain N target time domain echo signals corresponding to the pre-set antennas;

In specific applications, the N frequency domain echo signals can be expressed as a set $S_\gamma = \{s_{\gamma 1}(f), s_{\gamma 2}(f), \ldots, s_{\gamma N}(f)\}$.

In one embodiment, the first pre-set algorithm can comprises up-sampling and Fourier transforming, wherein the up-sampling is used for carrying out frequency sampling filtering on the N frequency domain echo signals, and the Fourier transforming is used for converting the N frequency domain echo signals into the N target time domain echo signals.

S30: an average value of each target time domain echo signal among the N target time domain echo signals is respectively calculated, and a pre-set area where the target time domain echo signal with the maximum average value is located is filtered to obtain N filtered target time domain signals.

In specific applications, the average values can be expressed as a set $\bar{s}_\gamma(t) = s_{\gamma 1}(t), s_{\gamma 2}(t), \ldots, s_{\gamma N}(t)$, and the N target time domain echo signals can be expressed as a set $\bar{s}_{\gamma,i}(t) = s_{\gamma 1, i1}(t), s_{\gamma 2, i2}(t), \ldots s_{\gamma N, iN}(t)$.

In one embodiment, the step "a pre-set area where the target time domain echo signal with the maximum average value is located is filtered to obtain N filtered target time domain signals" particularly comprises:

S31: the pre-set area where the target time domain echo signal with the maximum average value is located is filtered by means of a rectangular window filter having a pre-set width to obtain the N filtered target time domain signals.

In specific applications, the pre-set area is area including the target time domain echo signal with the maximum average value and its area around, and can be particularly set as actually needed; and the pre-set width can also be set as actually needed, for instance, the pre-set width can be within the range of 5-20 system distance units of the rectangular window filter. In one embodiment, the pre-set width can be 10 system distance units.

S40: the N filtered target time domain signals are calculated by means of a second pre-set algorithm to obtain N target frequency domain echo signals with the frequencies and dimensions consistent with those of the N frequency domain echo signals.

In one embodiment, the second pre-set algorithm comprises Fourier transforming, down-sampling, and frequency interception, wherein the Fourier transforming is used for converting the N filtered target time domain signals into N first frequency domain echo signals, the down-sampling is used for carrying out frequency sampling filtering on the N first frequency domain echo signals, and the frequency interception is used for intercepting signals with the frequencies within a pre-set frequency range among the N first frequency domain echo signals as needed.

S50: cancellation subtraction is carried out on the N target frequency domain echo signals and the N target time domain echo signals to obtain direct wave suppression results of the N frequency domain echo signals.

In specific applications, the direct wave suppression results of the N frequency domain echo signals subjected to cancellation subtraction can be expressed as a set $S'_\gamma = s'_{\gamma 1}(f), s'_{\gamma 2}(f), \ldots, s'_{\gamma N}(f)$.

S60: S20 is performed again until the direct wave suppression results of the total M*N frequency domain echo signals obtained by means of all the antennas among the M antennas scanning the N azimuth position points are obtained.

S20-S40 are performed repeatedly to fulfill direct wave suppression of all the frequency domain echo signals.

In one embodiment, S20-S40 are simultaneously performed on the N frequency domain echo signals acquired by each antenna, to fulfill batch processing of direct waves in the frequency domain echo signals acquired by all the antennas.

In one embodiment, the direct wave suppression method further comprises:

S70: the frequency domain echo signal of each channel in the frequency domain echo signal set is multiplied by an amplitude-phase pre-correction factor corresponding to the frequency domain echo signal of the channel.

In one embodiment, the direct wave suppression method further comprises the following steps performed before S70:

S71: the amplitude-phase pre-correction factor which corresponds to the frequency domain echo signal of each channel and is used for carrying out amplitude-phase consistency compensation on the frequency domain echo signal corresponding to the amplitude-phase pre-correction factor during imaging processing is measured in advance; and S72: off-line storage is carried out on the amplitude-phase pre-correction factor.

In this embodiment, by means of carrying out a series of filtering operations, such as conversion from a frequency domain to a time domain, filtering, conversion from the time domain to the frequency domain, and the cancellation subtraction, on the echo signal set composed of the echo signals obtained from the vertical linear array antenna at all the equivalent antenna collection positions thereof, interference caused by a direct wave signal can be effectively suppressed, thus improving the sensitivity of an echo signal receiver, simplifying the subsequent imaging processing process, and improving the imaging performance of a microwave imaging system. Thus, an accurate image of a target object can be obtained.

Figure 3:
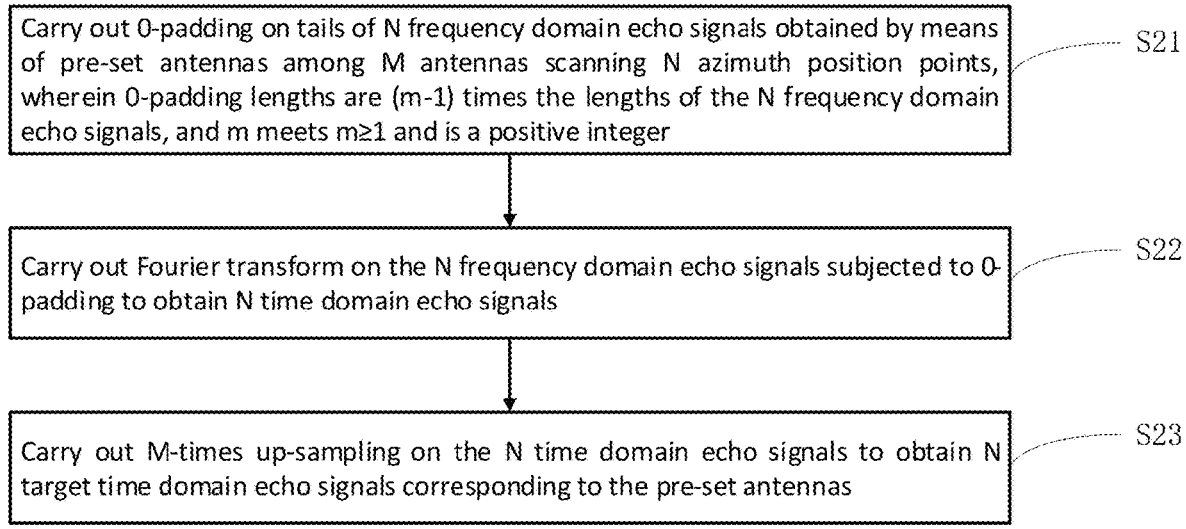
FIG. 3 is a flow block diagram of S20 in FIG. 2 in one embodiment of the disclosure.

As shown in in FIG. 3, in one embodiment of the disclosure, S20 shown in FIG. 2 particularly comprises:

S21: 0-padding is carried out on tails of the N frequency domain echo signals obtained by means of the pre-set antennas among the M antennas scanning the N azimuth position points, wherein 0-padding lengths are (m−1) times the lengths of the N frequency domain echo signals, and m≥1 meets and is a positive integer.

In specific applications, m can be set as actually needed, for instance, m can be any value from 0 to 20. In one embodiment, m is 8.

S22: Fourier transforming is carried out on the N frequency domain echo signals subjected to 0-padding to obtain N time domain echo signals.

In specific applications, the Fourier transforming in S22 can be parallel fast Fourier transforming, that is to say, fast Fourier transforming is synchronously carried out on the N frequency domain echo signals subjected to 0-padding.

S23: M-times up-sampling is carried out on the N time domain echo signals to obtain the N target time domain echo signals corresponding to the pre-set antennas.

In specific applications, the N target time domain echo signals are expressed as a set $S''_\gamma = s_{\gamma 1}(t), s_{\gamma 2}(t), \ldots, s_{\gamma N}(t)$.

In this embodiment, 0-padding, Fourier transforming, and up-sampling are sequentially carried out on the N frequency domain echo signals, so as to process the N frequency domain echo signals into N filtered time domain echo signals.

Figure 4:
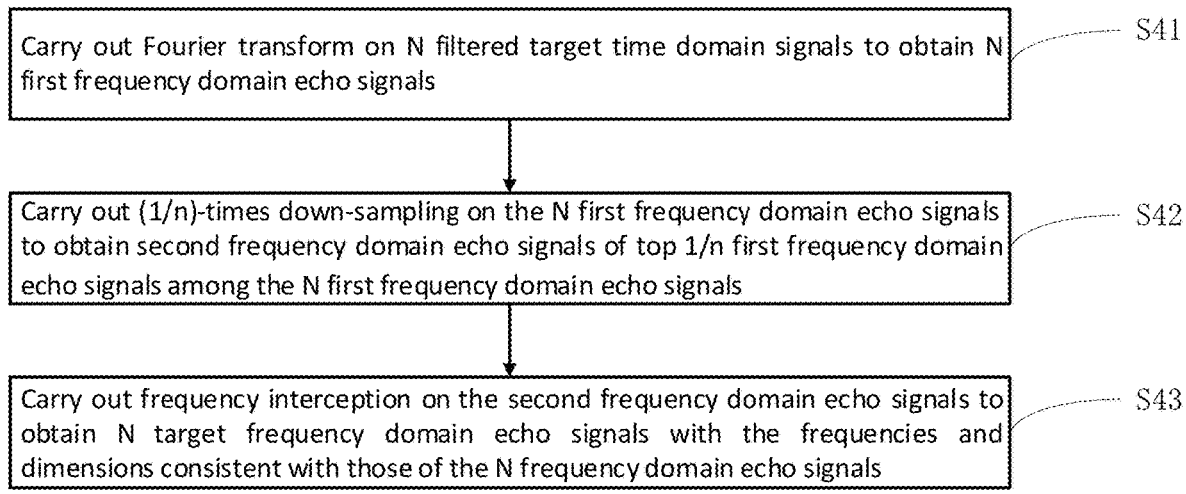
FIG. 4 is a flow block diagram of S40 in FIG. 2 in one embodiment of the disclosure.

As shown in in FIG. 4, in one embodiment of the disclosure, S40 shown in FIG. 2 particularly comprises:

S41: Fourier transforming is carried out on the N filtered target time domain signals to obtain N first frequency domain echo signals.

In specific applications, the Fourier transforming in S41 can be parallel fast Fourier transforming, that is to say, fast Fourier transforming is synchronously carried out on the N filtered frequency domain echo signals.

S42: (1/n)-times down-sampling is carried out on the N first frequency domain echo signals to obtain second frequency domain echo signals of top 1/n part of the N first frequency domain echo signals; and S43: frequency interception is carried out on the second frequency domain echo signals to obtain the N target frequency domain echo signals with the frequencies and dimensions consistent with those of the N frequency domain echo signals.

In specific applications, the objective of carrying out frequency interception to obtain the N target frequency domain echo signals with the frequencies and dimensions consistent with those of the N frequency domain echo signals is to guarantee in one-to-one correspondence between frequency domain signals and time domain signals during subsequent cancellation subtraction.

In specific application, the N target frequency domain echo signals can be expressed as a set $\bar{s}_\gamma(f) = s''_{\gamma 1}(f), s''_{\gamma 2}(f), \ldots, s''_{\gamma N}(f)$.

In this embodiment, Fourier transforming, down-sampling, and frequency interception are sequentially carried out on the N filtered target time domain echo signals to obtain the N target frequency domain echo signals with the frequencies and dimensions consistent with those of the N frequency domain echo signals, so as to facilitate cancellation subtraction in S50.

Figure 5:
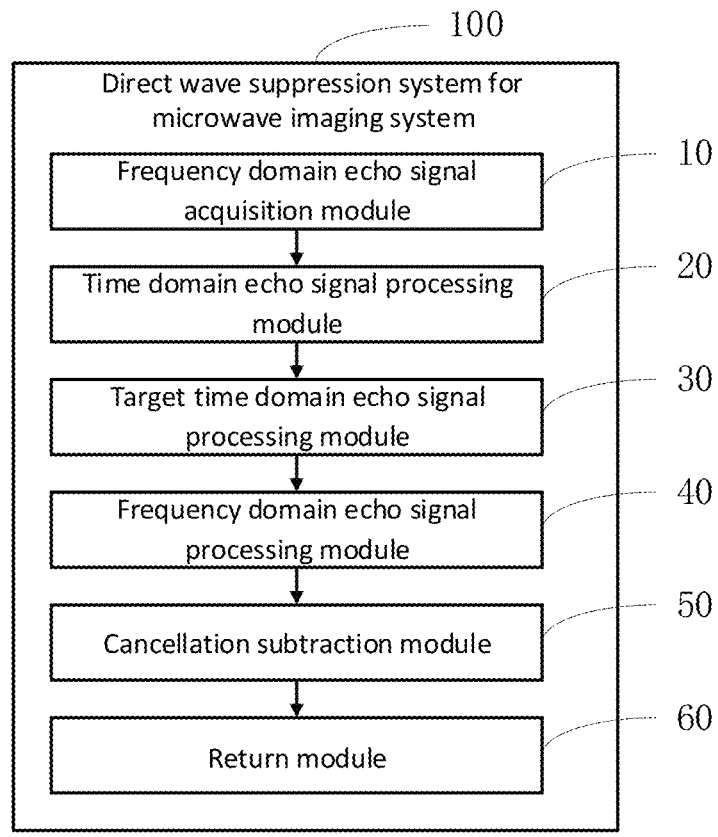
FIG. 5 is a basic structural block diagram of the direct wave suppression method for a microwave imaging system in one embodiment of the disclosure.

As shown in FIG. 5, one embodiment of the disclosure provides a direct wave suppression system 100 for a microwave imaging system. The direct wave suppression system is used for performing the steps of the embodiment shown in FIG. 2 and comprises:

A frequency domain echo signal acquisition module 10 used for controlling the rotation of a vertical linear array antenna composed of M antennas around a pre-set arc track to scan N azimuth position points in a target area, so as to acquire M*N frequency domain echo signals and to create a frequency domain echo signal set, wherein M and N are both positive integers greater than 0;

A time domain echo signal processing module 20 used for calculating, by means of a first pre-set algorithm, N frequency domain echo signals obtained by means of pre-set antennas among the M antennas scanning the N azimuth position points, to obtain N target time domain echo signals corresponding to the pre-set antennas;

A target time domain echo signal processing module 30 used for respectively calculating an average value of each target time domain echo signal among the N target time domain echo signals and filtering a pre-set area where the target time domain echo signal with the maximum average value is located, to obtain N filtered target time domain signals;

A frequency domain echo signal processing module 40 used for calculating the N filtered target time domain signals by means of a second pre-set algorithm to obtain N target frequency domain echo signals with the frequencies and dimensions consistent with those of the N frequency domain echo signals;

A cancellation subtraction module 50 used for carrying out cancellation subtraction on the N target frequency domain echo signals and the N target time domain echo signals to obtain direct wave suppression results of the N frequency domain echo signals; and A return module 60 used for returning to the step of calculating, by means of a first pre-set algorithm, N frequency domain echo signals obtained by means of pre-set antennas among the M antennas scanning the N azimuth position points until the direct wave suppression results of the total M*N frequency domain echo signals obtained by means of all the antennas among the M antennas scanning the N azimuth position points are obtained.

In one embodiment, the target time domain echo signal processing module 30 is particularly used for filtering the pre-set area where the target time domain echo signal with the maximum average value is located by means of a rectangular window filter having a pre-set width, to obtain the N filtered target time domain signals.

In one embodiment, the direct wave suppression system 100 further comprises:

A logical operation module used for multiplying the frequency domain echo signal of each channel in the frequency domain echo signal set by an amplitude-phase pre-correction factor corresponding to the frequency domain echo signal of the each channel.

In one embodiment, the direct wave suppression system further comprises:

An amplitude-phase pre-correction factor measurement module used for measuring in advance the amplitude-phase pre-correction factor which corresponds to the frequency domain echo signal of each channel and is used for carrying out amplitude-phase consistency compensation on the frequency domain echo signal corresponding to the amplitude-phase pre-correction factor during imaging processing; and A storage module used for carrying out off-line storage on the amplitude-phase pre-correction factor.

In this embodiment, by means of carrying out a series of filtering operations, such as conversion from a frequency domain to a time domain, filtering, conversion from the time domain to the frequency domain, and the cancellation subtraction, on the echo signal set composed of the echo signals obtained from the vertical linear array antenna at all the equivalent antenna collection positions thereof, interference caused by a direct wave signal can be effectively suppressed, thus improving the sensitivity of an echo signal receiver, simplifying the subsequent imaging processing process, and improving the imaging performance of a microwave imaging system. Thus, an accurate image of a target object can be obtained.

Figure 6:
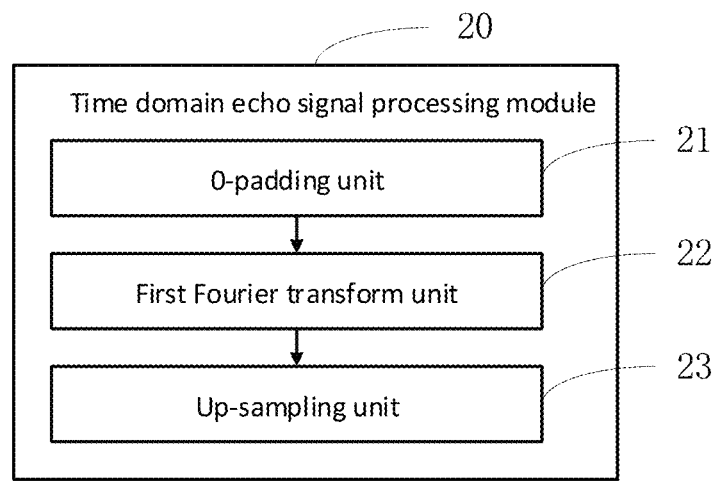
FIG. 6 is a specific structural block diagram of a time domain echo signal processing module in FIG. 5 in one embodiment of the disclosure.

As shown in FIG. 6, in one embodiment, the time domain echo signal processing module shown in FIG. 5 is configured to perform the steps of the method in the embodiment shown in FIG. 3 and comprises:

A 0-padding unit 21 used for carrying out 0-padding on tails of the N frequency domain echo signals obtained by means of the pre-set antennas among the M antennas scanning the N azimuth position points, wherein 0-padding lengths are (m−1) times of lengths of the N frequency domain echo signals, and m meets and is a positive integer;

A first Fourier transform unit 22 used for carrying out Fourier transforming on the N frequency domain echo signals subjected to 0-padding to obtain N time domain echo signals; and An up-sampling unit 23 used for carrying out M-times up-sampling on the N time domain echo signals to obtain the N target time domain echo signals corresponding to the pre-set antennas.

In this embodiment, 0-padding, Fourier transforming, and up-sampling are sequentially carried out on the N frequency domain echo signals, so as to process the N frequency domain echo signals into N filtered time domain echo signals.

Figure 7:
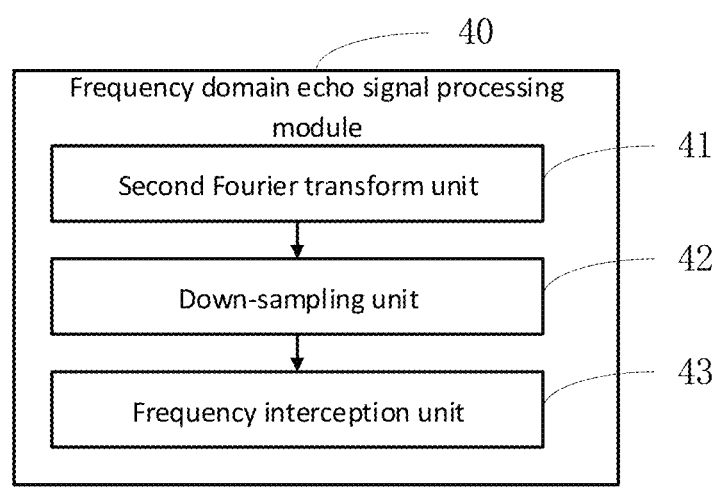
FIG. 7 is a specific structural block diagram of a frequency domain echo signal processing module in FIG. 5 in one embodiment of the disclosure.

As shown in FIG. 7, in one embodiment, the frequency domain echo signal processing module shown in FIG. 5 is configured to perform the steps of the method in the embodiment shown in FIG. 3 and comprises:

A second Fourier transform unit 41 used for carrying out Fourier transforming on the N filtered target time domain signals to obtain N first frequency domain echo signals;

A down-sampling unit 42 used for carrying out (1/n)-times down-sampling on the N first frequency domain echo signals to obtain second frequency domain echo signals of top 1/n part of the N first frequency domain echo signals; and A frequency interception unit 43 used for carrying out frequency interception on the second frequency domain echo signals to obtain the N target frequency domain echo signals with the frequencies and dimensions consistent with those of the N frequency domain echo signals.

In this embodiment, Fourier transforming, down-sampling, and frequency interception are sequentially carried out on the N filtered target time domain echo signals to obtain the N target frequency domain echo signals with the frequencies and dimensions consistent with those of the N frequency domain echo signals, so as to facilitate cancellation subtraction.

The modules or units in all the embodiments of the disclosure can be implemented through a universal integrated circuit such as a CPU (Central Processing Unit), or an ASIC (Application Specific Integrated Circuit).

The steps of the method in all the embodiments of the disclosure can be reordered, combined, or omitted according to actual requirements.

The modules or units of the device in all the embodiments of the disclosure can be combined, partitioned, or omitted according to actual requirements.

It would be appreciated by those ordinarily skilled in the art that all or part of the procedures of the method in the above embodiments can be implemented by relevant hardware instructed by a computer program, wherein the program is stored in a computer-readable storage medium, and when the program runs, the procedures of the method in the above embodiments can be performed. Wherein, the storage medium is a disk, a CD, a read-only memory (ROM), a random access memory (RAM), or the like.

The above embodiments are only preferred ones of the disclosure, and are not intended to limit the disclosure. Any modifications, equivalent substitutes and improvements achieved based on the spirit and principle of the disclosure should also fall within the protection scope of the disclosure.

What is claimed is:

1. A direct wave suppression method for a microwave imaging system, comprising:

controlling rotation of a vertical linear array antenna composed of M antennas around a pre-set arc track to scan N azimuth position points in a target area, so as to acquire M*N frequency domain echo signals and to create a frequency domain echo signal set, wherein M and N are both positive integers greater than 0;

calculating, using a first pre-set algorithm, N frequency domain echo signals obtained using pre-set antennas among the M antennas scanning the N azimuth position points, to obtain N target time domain echo signals corresponding to the pre-set antennas;

calculating an average value of each said target time domain echo signal among the N target time domain echo signals, and filtering a pre-set area where the target time domain echo signal with a maximum average value is located, to obtain N filtered target time domain signals;

calculating the N filtered target time domain signals using a second pre-set algorithm to obtain N target frequency domain echo signals with frequencies and dimensions consistent with those of the N frequency domain echo signals;

carrying out cancellation subtraction on the N target frequency domain echo signals and the N target time domain echo signals to obtain direct wave suppression results of the N frequency domain echo signals; and returning to the calculating, using the first pre-set algorithm, the N frequency domain echo signals obtained using pre-set antennas among the M antennas scanning the N azimuth position points until the direct wave suppression results of total M*N frequency domain echo signals obtained using all antennas among the M antennas scanning the N azimuth position points are obtained.

2. The direct wave suppression method according to claim 1, wherein the first pre-set algorithm comprises up-sampling and Fourier transforming; and calculating, using the first pre-set algorithm, the N frequency domain echo signals obtained using the pre-set antennas among the M antennas scanning the N azimuth position points to obtain the N target time domain echo signals corresponding to the pre-set antennas comprises:

carrying out 0-padding on tails of the N frequency domain echo signals obtained using the pre-set antennas among the M antennas scanning the N azimuth position points, wherein 0-padding lengths are (m−1) times of lengths of the N frequency domain echo signals, and m meets m≥1 and is a positive integer;

carrying out Fourier transforming on the N frequency domain echo signals subjected to 0-padding to obtain N time domain echo signals; and carrying out m-times up-sampling on the N time domain echo signals to obtain the N target time domain echo signals corresponding to the pre-set antennas.

3. The direct wave suppression method according to claim 1, wherein the second pre-set algorithm comprises Fourier transforming, down-sampling, and frequency interception; and calculating the N filtered target time domain signals using the second pre-set algorithm to obtain the N target frequency domain echo signals with the frequencies and dimensions consistent with those of the N frequency domain echo signals comprises:
carrying out Fourier transforming on the N filtered target time domain signals to obtain N first frequency domain echo signals;
carrying out (1/n)-times down-sampling on the N first frequency domain echo signals to obtain second frequency domain echo signals of top 1/n part of the N first frequency domain echo signals; and
carrying out frequency interception on the second frequency domain echo signals to obtain the N target frequency domain echo signals with the frequencies and dimensions consistent with those of the N frequency domain echo signals.

4. The direct wave suppression method according to claim 1, wherein the direct wave suppression method further comprises:
multiplying the frequency domain echo signal of each channel in the frequency domain echo signal set by an amplitude-phase pre-correction factor corresponding to the frequency domain echo signal of each channel.

5. The direct wave suppression method according to claim 4, wherein the direct wave suppression method further comprises:
before multiplying the frequency domain echo signal of each channel in the frequency domain echo signal set by an amplitude-phase pre-correction factor corresponding to the frequency domain echo signal of each channel:
measuring in advance the amplitude-phase pre-correction factor which corresponds to the frequency domain echo signal of each said channel and is used for carrying out amplitude-phase consistency compensation on the frequency domain echo signal corresponding to the amplitude-phase pre-correction factor during imaging processing; and
carrying out off-line storage on the amplitude-phase pre-correction factor.

6. A direct wave suppression system for a microwave imaging system, comprising:
a frequency domain echo signal acquisition module used for controlling rotation of a vertical linear array antenna composed of M antennas around a pre-set arc track to scan N azimuth position points in a target area, so as to acquire M*N frequency domain echo signals and to create a frequency domain echo signal set, wherein M and N are both positive integers greater than 0;
a time domain echo signal processing module used for calculating, using a first pre-set algorithm, N frequency domain echo signals obtained using pre-set antennas among the M antennas scanning the N azimuth position points, to obtain N target time domain echo signals corresponding to the pre-set antennas;
a target time domain echo signal processing module used for respectively calculating an average value of each said target time domain echo signal among the N target time domain echo signals and filtering a pre-set area where the target time domain echo signal with a maximum average value is located, to obtain N filtered target time domain signals;
a frequency domain echo signal processing module used for calculating the N filtered target time domain signals using a second pre-set algorithm to obtain N target frequency domain echo signals with frequencies and dimensions consistent with those of the N frequency domain echo signals;
a cancellation subtraction module used for carrying out cancellation subtraction on the N target frequency domain echo signals and the N target time domain echo signals to obtain direct wave suppression results of the N frequency domain echo signals; and
a return module used for returning to the step of calculating, using a first pre-set algorithm, N frequency domain echo signals obtained using pre-set antennas among the M antennas scanning the N azimuth position points until the direct wave suppression results of total M*N frequency domain echo signals obtained using all antennas among the M antennas scanning the N azimuth position points are obtained.

7. The direct wave suppression system according to claim 6, wherein the first pre-set algorithm comprises up-sampling and Fourier transforming; and
the time domain echo signal processing module comprises:
an 0-padding unit used for carrying out 0-padding on tails of the N frequency domain echo signals obtained using the pre-set antennas among the M antennas scanning the N azimuth position points, wherein 0-padding lengths are (m−1) times of lengths of the N frequency domain echo signals, and m meets m≥1 and is a positive integer;
a first Fourier transform unit used for carrying out Fourier transforming on the N frequency domain echo signals subjected to 0-padding to obtain N time domain echo signals; and
an up-sampling unit used for carrying out m-times up-sampling on the N time domain echo signals to obtain the N target time domain echo signals corresponding to the pre-set antennas.

8. The direct wave suppression system according to claim 6, wherein the second pre-set algorithm comprises Fourier transforming, down-sampling, and frequency interception; and
the frequency domain echo signal processing module comprises:
a second Fourier transform unit used for carrying out Fourier transforming on the N filtered target time domain signals to obtain N first frequency domain echo signals;
a down-sampling unit used for carrying out (1/n)-times down-sampling on the N first frequency domain echo signals to obtain second frequency domain echo signals of top 1/n part of the N first frequency domain echo signals; and
a frequency interception unit used for carrying out frequency interception on the second frequency domain echo signals to obtain the N target frequency domain echo signals with the frequencies and dimensions consistent with those of the N frequency domain echo signals.

9. The direct wave suppression system according to claim 6, wherein the direct wave suppression system further comprises:
a logical operation module used for multiplying the frequency domain echo signal of each channel in the frequency domain echo signal set by an amplitude-phase pre-correction factor corresponding to the frequency domain echo signal of the channel.

10. The direct wave suppression system according to claim 9, wherein the direct wave suppression system further comprises:
an amplitude-phase pre-correction factor measurement module used for measuring in advance the amplitude-phase pre-correction factor which corresponds to the frequency domain echo signal of each said channel and is used for carrying out amplitude-phase consistency compensation on the frequency domain echo signal corresponding to the amplitude-phase pre-correction factor during imaging processing; and
a storage module used for carrying out off-line storage on the amplitude-phase pre-correction factor.

* * * * *